US007197917B2

(12) United States Patent
Hasegawa

(10) Patent No.: US 7,197,917 B2
(45) Date of Patent: Apr. 3, 2007

(54) METHOD AND APPARATUS FOR DIAGNOSING FAILURE OF AN ATMOSPHERIC PRESSURE SENSOR IN AN ENGINE CONTROL SYSTEM

(75) Inventor: Shumpei Hasegawa, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/356,340

(22) Filed: Feb. 16, 2006

(65) Prior Publication Data

US 2006/0179926 A1   Aug. 17, 2006

(30) Foreign Application Priority Data

Feb. 16, 2005   (JP)   ............... 2005-039070

(51) Int. Cl.
*G01M 15/00* (2006.01)
(52) U.S. Cl. ...................... 73/118.1; 701/34
(58) Field of Classification Search ............... 73/116, 73/117.2, 117.3, 118.1, 118.2, 119 R; 340/439; 701/29, 34
See application file for complete search history.

(56) References Cited

U.S. PATENT DOCUMENTS

| 5,698,780 | A | * | 12/1997 | Mizutani et al. ........... 73/118.2 |
| 5,746,174 | A | * | 5/1998 | Abe et al. ................. 123/306 |
| 5,808,189 | A | * | 9/1998 | Toyoda ..................... 73/118.2 |
| 6,898,511 | B2 | * | 5/2005 | Denz et al. ............... 701/114 |
| 2003/0154777 | A1 | * | 8/2003 | Worth et al. ............. 73/118.2 |
| 2003/0195682 | A1 | * | 10/2003 | Lee ........................... 701/34 |
| 2005/0182555 | A1 | * | 8/2005 | Yu et al. .................. 701/107 |
| 2006/0184308 | A1 | * | 8/2006 | Hasegawa ............... 701/114 |
| 2006/0184309 | A1 | * | 8/2006 | Hasegawa ............... 701/114 |
| 2006/0184310 | A1 | * | 8/2006 | Hasegawa ............... 701/114 |

FOREIGN PATENT DOCUMENTS

| JP | 10-176582 | 6/1998 |
| JP | 2003-307152 | 10/2003 |

* cited by examiner

*Primary Examiner*—Eric S. McCall
(74) *Attorney, Agent, or Firm*—Carrier, Blackman & Associates, P.C.; William D. Blackman; Joseph P. Carrier

(57) ABSTRACT

A failure diagnosis apparatus and method permit specification of a failed atmospheric pressure sensor in an engine control apparatus having redundant pressure detection systems to ensure failsafe control of the engine. The apparatus includes a calculating unit that calculates a difference between a first atmospheric pressure and a second atmospheric pressure detected in respective pressure detection systems. A first comparing unit outputs an alarm when the difference is larger than a threshold value. A difference calculating unit calculates a first difference between the first atmospheric pressure and a manifold pressure. A difference calculating unit calculates a second difference between the second atmospheric pressure and the manifold pressure. A second comparing unit compares the first and second differences in response to output of the alarm from the first comparing unit while an engine is stopped. The sensor having abnormal function corresponds to the one for which the difference is larger.

11 Claims, 4 Drawing Sheets

METHOD AND APPARATUS FOR DIAGNOSING FAILURE OF AN ATMOSPHERIC PRESSURE SENSOR IN AN ENGINE CONTROL SYSTEM

CROSS-REFERENCE TO RELATED APPLICATIONS

The present invention claims priority under 35 U.S.C. 119 based on Japanese patent application No. 2005-039070, filed on Feb. 16, 2005. The subject matter of these priority documents is incorporated by reference herein.

BACKGROUND OF THE INVENTION

1. Field of the Invention

The present invention relates to an apparatus for diagnosing failure in atmospheric pressure sensors used in an engine control system and, more specifically, to a method and apparatus for diagnosing failure in atmospheric pressure sensors in a system having a first atmospheric pressure sensor, and a second, redundant atmospheric pressure sensor that provides a back up for the first atmospheric pressure sensor.

2. Description of the Background Art

Hitherto, a number of sensors have been used in an engine control system, and employment of a failure diagnosis system to diagnose whether or not these sensors are operating normally is known. For example, JP-A-2003-307152 discloses a method that includes the steps of determining whether or not an output signal of a sensor that senses a pressure in an intake manifold is within a preset range, calculating the pressure in the intake manifold on the basis of engine operating conditions, and when the output signal from the sensor is within the range, determining whether or not the difference between the pressure in the intake manifold indicated by the output signal from the sensor and the calculated pressure in the intake manifold is smaller than a set value. In the disclosed method, when the output signal from the sensor is not within the preset range or when the difference is not smaller than the set value, the calculated pressure is set as the pressure in the intake manifold.

The disclosure of JP-A-10-176582 is directed to another example of use of a plurality of sensors in an engine control system and employment of a failure diagnosis system in which an electronically controlled throttle apparatus employs two sensor systems. Each sensor system includes an accelerator sensor, a throttle sensor, and so on, and are provided for the purpose of ensuring failsafe engine control or the like. Failure diagnosis is performed by comparing sensor outputs of the two systems. For example, by comparing a deviation between a main throttle sensor and a sub throttle sensor and a predetermined threshold value, whether or not the throttle sensor is failed is determined.

Of the possible failures of a sensor system, failures such as disconnection and short circuit can be determined when a sensor output value is too high or too low with respect to a predetermined value or a predetermined range, and can be addressed as determined in advance. However, there is a case in which change or deterioration of output characteristics occur even though the sensor output value is within the predetermined range, and therefore a failure cannot be determined. In engine control for airplanes, for example, further strict standards are imposed for accuracy of failure diagnosis, and hence the failure diagnostic method in the related art is not sufficient to meet the strict standards.

On the other hand, the diagnostic method disclosed in JP-A-10-176582 can detect that either one of the two systems of sensors has a failure, but it is difficult to determine which one of the two systems of sensors has the failure when using this method.

It is an object of the invention to provide failure diagnosis method and apparatus for atmospheric pressure sensors which can reliably detect which atmospheric pressure sensor has a failure in a system having two (that is, redundant) systems of atmospheric pressure sensors.

SUMMARY

In order to achieve the above-described object, an inventive method of diagnosing failure of atmospheric pressure sensors used in an engine control system is provided. The engine control system includes a first atmospheric pressure sensor that is used to perform main control of the engine, a second, redundant atmospheric pressure sensor serves as a back up sensor for the first atmospheric pressure sensor, and a manifold pressure sensor. A failure of an atmospheric pressure sensor is determined when an atmospheric pressure value detected by the first atmospheric pressure sensor, or an atmospheric pressure value detected by the second atmospheric pressure sensor exceeds a predetermined value. The atmospheric pressure sensor whose output value is larger in difference from an output value of the manifold pressure sensor is specified as a failed sensor. In the method hereof, when a sensor is determined to be operating abnormally, identification of the failed sensor is performed while the engine is stopped.

In order to achieve the above-described object, an inventive failure diagnosis apparatus is provided for determining the failure of atmospheric pressure sensors used in an engine control system. The engine control system includes a first atmospheric pressure sensor that is used to perform main control, a second, redundant atmospheric pressure sensor that serves as a back up sensor for the first atmospheric pressure sensor, and a manifold pressure sensor. The apparatus is characterized by including an abnormality recognizing device that outputs an alarm signal when the difference between a first detected atmospheric pressure value, detected by the first atmospheric pressure sensor, and a second detected atmospheric pressure value, detected by the second atmospheric pressure sensor, exceeds a threshold value. The apparatus also includes an abnormality specifying device that calculates the respective differences of the first detected atmospheric pressure value and the second detected atmospheric pressure value with respect to a value detected by the manifold pressure sensor, and then specifies as a failed sensor the atmospheric pressure sensor which detects the atmospheric pressure value whose calculated difference is larger. In the apparatus, when a sensor is determined to be operating abnormally, identification of the failed sensor is performed, in response to the output of the alarm signal, while the engine is stopped.

The invention is further characterized in that determinations of differences by the abnormality recognizing device and the abnormality specifying device are performed using absolute values of the differences.

The invention is still further characterized by including an abnormality recognizing device and an abnormality specifying device. The abnormality recognizing device outputs an alarm signal when a ratio value between a first detected atmospheric pressure value, detected by the first atmospheric pressure sensor, and a second detected atmospheric pressure value, detected by the second atmospheric pressure sensor, is deviated from a predetermined range. The abnormality specifying device calculates a ratio value between a value detected by the manifold pressure sensor and the first detected atmospheric pressure value, and a ratio value between the value detected by the manifold pressure sensor and the second detected atmospheric pressure value. The abnormality specifying device then specifies the atmospheric pressure sensor which detected the atmospheric pressure corresponding to the one of the calculated ratio values which is deviated more from the predetermined value as the failed sensor. Identification of the failed sensor by the abnormality specifying device is performed in response to the output of the alarm signal while the engine is stopped.

According to the invention having the characteristics described above, the fact that at least one of the first and second atmospheric pressure sensors is failed is recognized when the difference between the outputs of the first and second atmospheric pressure sensors is large. When the abnormality in sensor output is determined, the differences between the pressures detected by the first and second atmospheric pressure sensors and the pressure detected by the manifold pressure sensor are calculated on condition that the engine is stopped, and the atmospheric pressure sensor which has detected the pressure whose calculated difference is larger (according to the last characteristic described above, the one whose ratio value is deviated more from the predetermined value) can be determined to have failed.

Therefore, abnormalities in sensor output which cannot be detected by the known failure detection device in the related art, which determines abnormality of the sensor only from the fact that the output of the sensor is simply deviated from the predetermined range, for example, the sensor whose function is lowered by deterioration, can be detected by the present invention.

Accordingly, in an engine control system having redundant atmospheric pressure detection systems for securing failsafe engine operation, in which when one of the detection systems is failed, the other detection system backs it up, whether both of the atmospheric pressure detection systems are operating normally or have failed can be determined while the engine is started. In addition, based on this determination, a compensating operation required to the control system is enabled. The compensating operation includes usage of substitute value or switching operation to a backup system.

Modes for carrying out the present invention are explained below by reference to an embodiment of the present invention shown in the attached drawings. The above-mentioned object, other objects, characteristics and advantages of the present invention will become apparent form the detailed description of the embodiment of the invention presented below in conjunction with the attached drawings.

DETAILED DESCRIPTION

A selected illustrative embodiment of the invention will now be described in some detail with reference to the drawings. It should be understood that only structures considered necessary for clarifying the present invention are described herein. Other conventional structures, and those of ancillary and auxiliary components of the system, are assumed to be known and understood by those skilled in the art.

Figure 2:
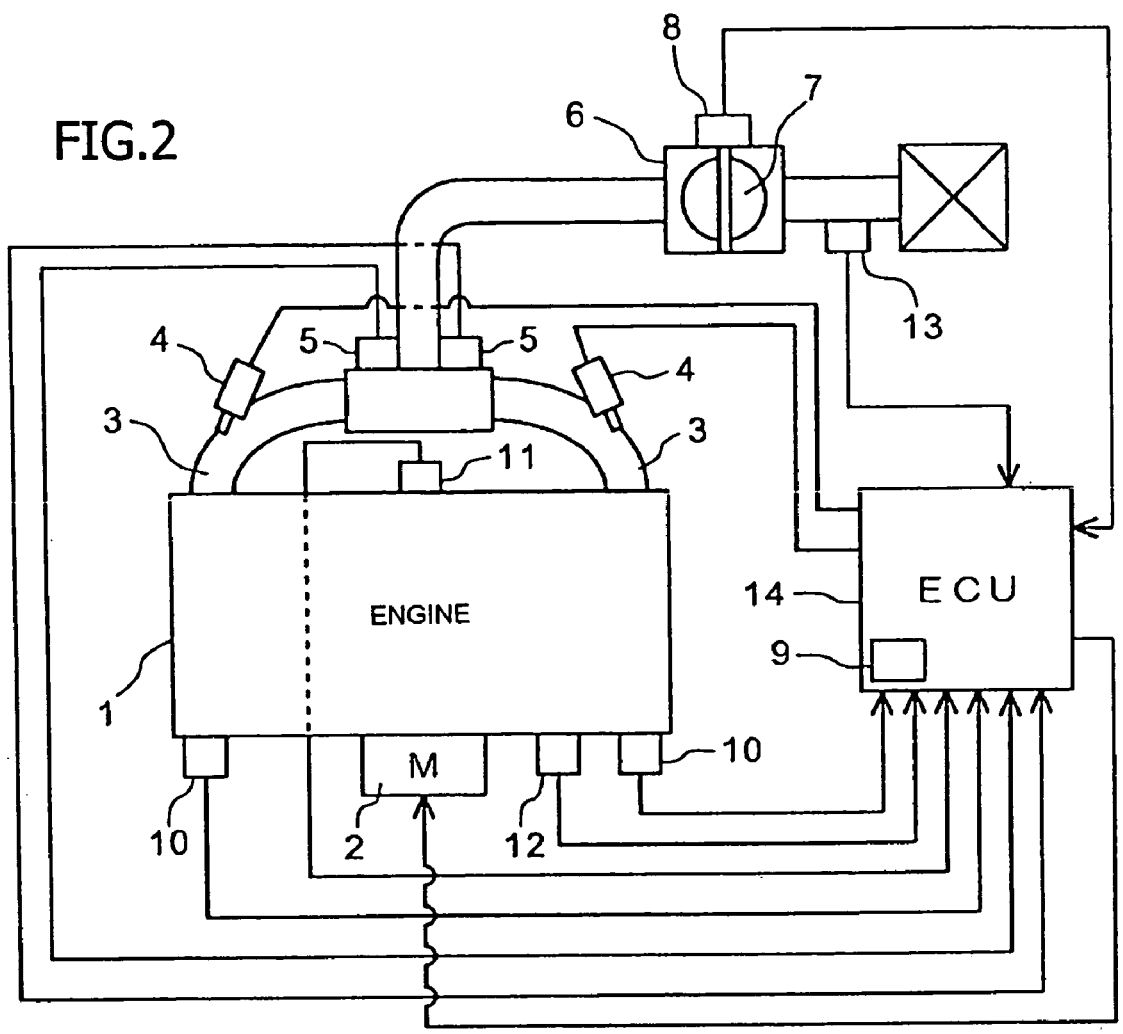
FIG. 2 is a general drawing of an engine control system including the failure diagnosis apparatus according to the embodiment of the invention.

Referring now to FIG. 2, this figure provides a block diagram of a principal portion of an engine including a failure diagnosis apparatus. In FIG. 2, an engine 1 is a reciprocal internal combustion engine for an airplane, and is provided with a starter motor 2 for activation. Although components for two cylinders are shown in FIG. 2, the number of cylinders in the engine 1 is not limited. An intake manifold 3 of the engine 1 is provided with fuel injection valves 4, and manifold pressure sensors 5 on the upstream side of the fuel injection valve 4 are provided for detecting a pressure in the intake manifold 3. A throttle body 6 is provided on the upstream side of the manifold pressure sensor 5, and a throttle valve 7 is assembled in the throttle body 6. The throttle valve 7 is driven by a motor 8. Known sensors required for controlling the engine such as an atmospheric pressure sensor 9, a cam pulser 10, a crankshaft pulser 11, a coolant temperature sensor 12, and an air temperature sensor 13, and so on are further provided for controlling the engine 1.

An electronic control unit (ECU) 14 performs fuel injection or ignition control according to a pre-stored program upon reception of output signals from the respective sensors described above. The ECU 14 includes a failure diagnostic function for the atmospheric pressure sensor 9.

Figure 3:
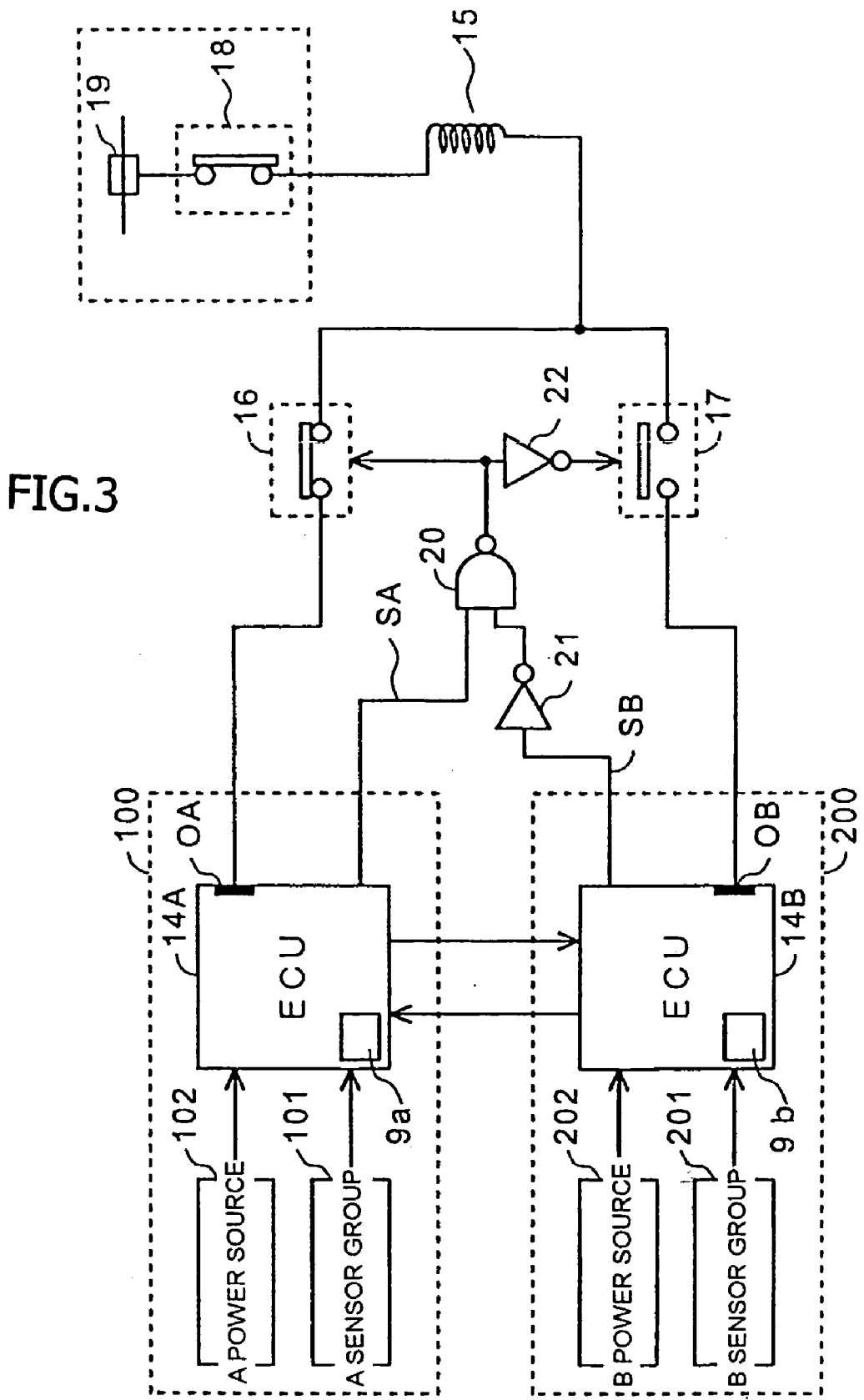
FIG. 3 is a block diagram showing a principal portion of the engine control system including the failure diagnosis apparatus according to the embodiment of the invention.

FIG. 3 is a block diagram showing a general structure of the engine control system described above. As shown in FIG. 3, the control system of this embodiment is provided with a main sensor system and a back up or redundant sensor system such that two systems of detection circuits are provided in the engine control system. Each system of detection circuits includes the sensors and an ECU 14 in order to provide a failsafe detection system. These systems are referred to as the A lane 100 and the B lane 200, respectively. The A lane 100 includes an A sensor group 101 including the sensors described in conjunction with FIG. 2, an A power source 102, and an ECU 14A for the A lane. Likewise, the B lane 200 includes a B sensor group 201, a B power source 202, and an ECU 14B for the B lane. Although the atmospheric pressure sensors 9 (9a and 9b) are provided on circuit boards which constitute the ECU 14A and the ECU 14B or in housings (not shown) of the ECUs 14A and 14B in this embodiment, positions of installation are not limited thereto.

The ECUs 14A and 14B are capable of two-way communication with each other via communication interfaces, not shown. One end (minus side) of a drive coil (only one is shown) 15 of the fuel injection valve 4 provided for each cylinder is connected to injection signal output terminals OA and OB of the ECU 14A and 14B, respectively, via changeover switches 16, 17. The other end (plus side) of the drive coil 15 is connected to a power source 19 which outputs, for example, a voltage of 14 volts via a power switch 18. The power switch 18 is provided with a current control function.

The power sources 19 and the power switches 18 may be provided in the ECUs 14A and 14B, respectively.

A switching signal SA outputted from the ECU 14A is connected to an input side of a NAND circuit 20 on one side, and a switching signal SB outputted from the ECU 14B on an input side of the NAND circuit 20 on the other side via a NOT circuit 21. The output from the NAND circuit 20 is supplied directly to the change-over switch 16, and also indirectly via another NOT circuit 22 to the change-over switch 17.

Power is distributed from the power source 19 to the drive coil 15 depending on the condition of the injection signal output terminal of the lane which is connected to one of the change-over switches 16, 17 selected by the switching signal SA and SB. The valve-open duration of the fuel injection valve 4, that is, the amount of fuel injection, is determined by the duration time of this power distribution.

Now, the failure diagnostic function of the atmospheric pressure sensors 9a and 9b included in the ECUs 14A and 14B, while the engine is running, will be described. In this embodiment, the A lane 100 detection circuit is used for main engine control. The B lane 200 detection circuit serves as a backup circuit to the A lane 100 in cases where an abnormality is detected in the function of the A lane 100.

Figure 4:
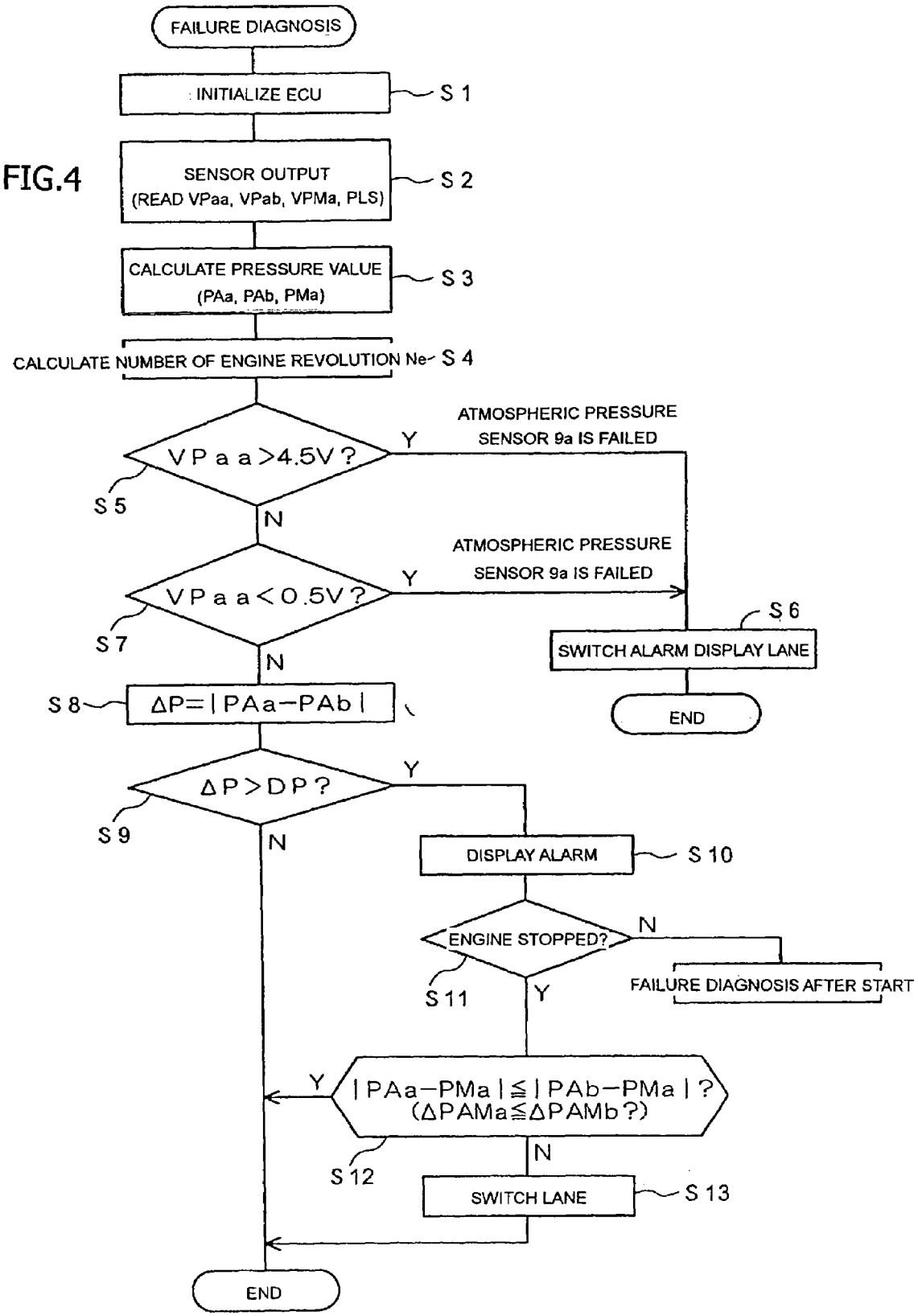
FIG. 4 is a flowchart showing a process of the principal portion of the diagnosis apparatus according to the embodiment of the invention.

FIG. 4 is a flowchart of the failure diagnosis processing of the atmospheric pressure sensors 9a and 9b. The process shown in FIG. 4 is activated when a starting switch of the engine 1 is switched from OFF to ON. In Step S1, the ECUs 14A and 14B are initialized. In Step S2, an output voltage VPaa of the atmospheric pressure sensor (first atmospheric pressure sensor) 9a of the A lane 100, an output voltage VPab of the atmospheric pressure sensor (second atmospheric pressure sensor) 9b of the B lane 200, an output voltage VPMa of the manifold pressure sensor 5 of the A lane 100, and a crank pulse PLS outputted from the crankshaft pulser 11 of the A lane 100 are read.

In Step S3, physical values PAa, PAb, and PMa (unit: mmHg) of the pressure are respectively calculated on the basis of the output voltages VPaa, VPab, and VPMa. For example, the output voltages are converted to the physical values using a prepared conversion table. In Step S4, an engine speed Ne (rpm) is calculated on the basis of the crank pulse PLS. The engine speed Ne can be calculated from intervals of the crank pulse PLS. When no crank pulse PLS is detected, the engine 1 is not rotating.

In Step S5, whether or not the voltage VPaa exceeds a predetermined upper limit value (4.5 volts in this case) is determined. If the result of the determination is affirmative, it is determined that the atmospheric pressure sensor 9a has failed due to short circuit or the like. Therefore, the procedure goes to Step S6, where an alarm display or a process of switching the lane from the A lane 100 to the B lane 200 is performed as a compensating operation to obviate the abnormality in sensor operation. When the result of Step S5 is negative, the procedure goes to Step S7.

In Step S7, whether or not the voltage VPaa is smaller than a predetermined lower limit value (0.5 volts for example) is determined. When the result of this determination is affirmative, it is determined that the atmospheric pressure sensor 9a has failed due to disconnection or the like. Therefore, the procedure goes to Step S6 and the compensating operation (described above) is performed.

When the determination in Step S7 is negative, it is determined that there is no failure such as short circuit or disconnection in the atmospheric pressure sensor 9a. However, there is a case in which the output voltage VPaa falls within the range defined by the upper limit value and the lower limit value even though a functional abnormality has occurred in the atmospheric pressure sensor 9a due to deterioration or the like, and hence the normal pressure value is not outputted from the atmospheric pressure sensor 9a. Therefore, the functional abnormality of the sensor output due to deterioration cannot be determined by the process in Steps S5 and S7.

Therefore, whether or not there is any deterioration in the atmospheric pressure sensor 9a is determined by the following process. In Step S8, the difference ΔP between the atmospheric pressures PAa and PAb is calculated. The difference ΔP is obtained as an absolute value. In Step S9, whether or not the difference ΔP is larger than a threshold value DP is determined. The threshold value DP is, for example, 44.8 mmHg. Since it is unlikely that the atmospheric pressure sensors 9a and 9b deteriorate to the same extent at the same time, when the difference ΔP is smaller than the threshold value DP, it is determined that the atmospheric pressure sensors 9a and 9b are operating normally, and hence the normal control loop is continued.

When the difference ΔP is larger than the threshold value DP, it is determined that either one of the atmospheric pressure sensors 9a or 9b is functionally abnormal, and the procedure goes to Step S10, where the alarm display for notifying the abnormality is executed.

Then, in the following steps, it is determined which one of the atmospheric pressure sensors 9a and 9b has failed, and the abnormal sensor is specified. In Step S11, whether or not the engine 1 is stopped is determined. In the disclosed embodiment, this determination is based on whether or not the engine speed Ne is zero, that is, whether the crank pulse PLS exists. However, other known methods of determining engine speed Ne may be used. When it is determined that the engine 1 is stopped, the procedure goes to Step S12.

In Step S12, an absolute value ΔPAMa of the difference between the detected pressure value PAa by the atmospheric pressure sensor 9a and the detected pressure value PMa by the manifold pressure sensor 5 and an absolute value ΔPAMb of the difference between the detected pressure value PAb by the atmospheric pressure sensor 9b and the detected pressure value PMa by the manifold pressure sensor 5 are compared.

When the result of the determination in Step S12 is negative, it is determined that an abnormality such as deterioration has occurred in the atmospheric pressure sensor 9a. Therefore, the procedure goes to Step S13 in order to switch the lane, and the output of the B lane 200 is subsequently employed for controlling the engine.

When the determination in Step S12 is affirmative, it is determined that an abnormality such as deterioration has occurred in the atmospheric pressure sensor 9b. In this case, since the abnormality has not occurred in the normal control lane, that is, the A lane 100, which is a main body of control, control by the A lane 100 as the normal control lane is continued.

When it is determined that the engine is not stopped in Step S11, the failure diagnosis cannot be achieved in the process of Step S12, and hence the procedure goes to a failure diagnosis routine after starting the engine. Since the failure diagnosis routine after having started the engine is not a principal portion of the invention, detailed description thereof will be omitted.

Figure 1:
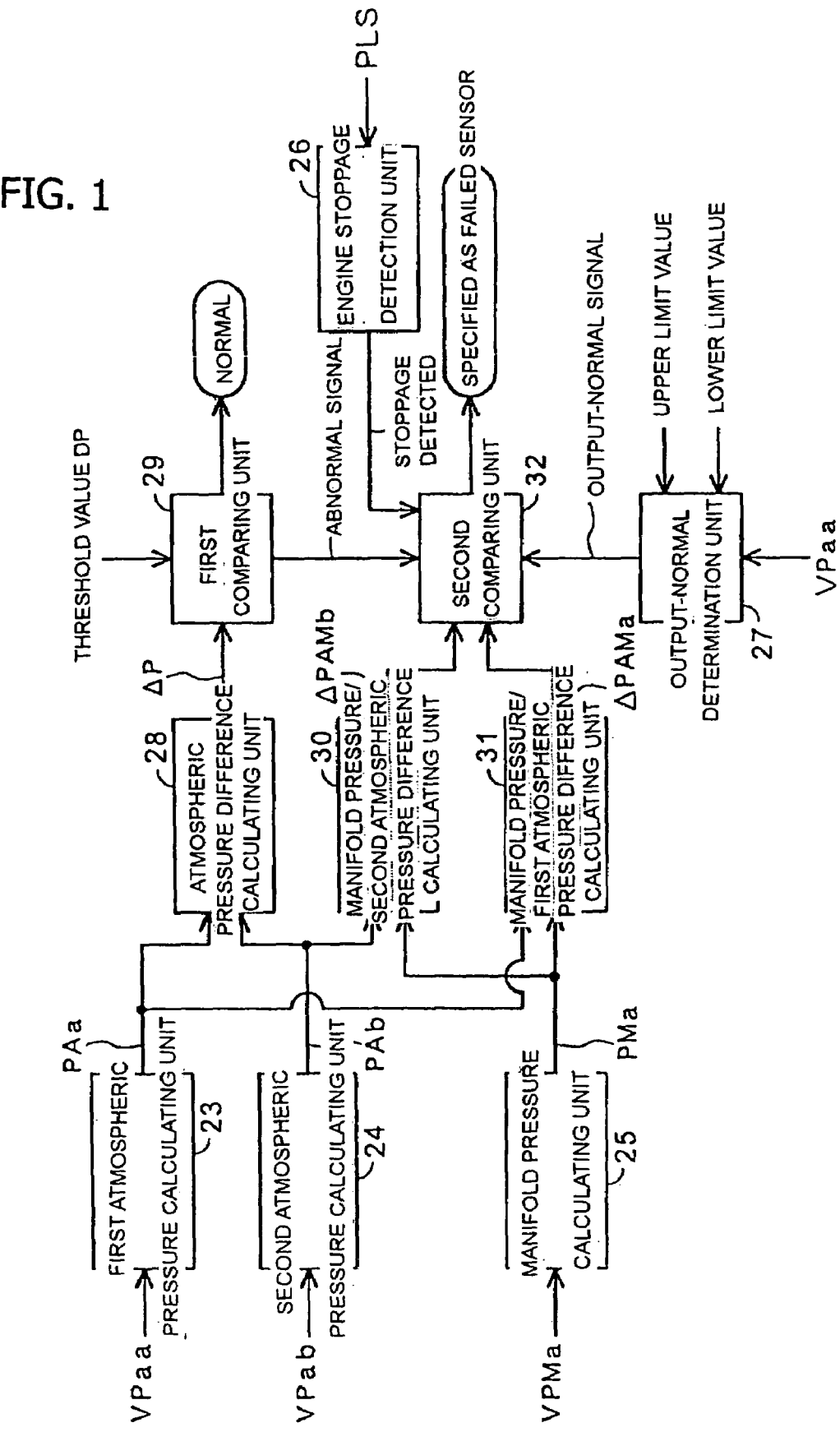
FIG. 1 is a block diagram showing the function of the principal portion of the ECU which performs the processing described in conjunction with the flowchart in FIG. 4, according to an embodiment of the invention.

FIG. 1 is a block diagram showing the function of the principal portion of the ECU 14A which performs the processing described in conjunction with the flowchart in FIG. 4. A first atmospheric pressure calculating unit 23 calculates the atmospheric pressure PAa on the basis of the detected values VPaa detected by the atmospheric pressure sensor 9*a*. A second atmospheric pressure calculating unit 24 calculates the atmospheric pressure PAb on the basis of the detected values VPab detected by the atmospheric pressure sensor 9*b*. A manifold pressure calculating unit 25 calculates the manifold internal pressure PMa on the basis of the detected values VPMa detected by the manifold pressure sensor 5. An engine stoppage detection unit 26 outputs a stoppage detection signal when the engine 1 is stopped, as determined by the existence or absence of the crank pulse PLS.

An output-normal determination unit 27 determines whether or not the detected value VPaa detected by the atmospheric pressure sensor 9*a* exists within the predetermined range, that is, between the upper limit value and the lower limit value, and when the detected value VPaa is within the predetermined range, outputs an output-normal signal.

An atmospheric pressure difference calculating unit 28 calculates the difference ΔP between the atmospheric pressure PAa and the atmospheric pressure PAb. A first comparing unit 29 compares the difference ΔP and the threshold value DP, and when the difference ΔP is smaller, outputs a normal signal, and when it is larger, outputs an alarm signal. The atmospheric pressure difference calculating unit 28 and the first comparing unit 29 constitute an abnormality recognizing device.

A manifold pressure/second atmospheric pressure difference calculating unit 30 calculates the difference ΔPAMb between the atmospheric pressure PAb and the manifold pressure PMa. A manifold pressure/first atmospheric pressure difference calculating unit 31 calculates the difference ΔPAMa between the atmospheric pressure PAa and the manifold pressure PMa. A second comparing unit 32 compares the difference ΔPAMa and the difference ΔPAMb in response to input of all of the alarm signal from the first comparing unit 29, the stoppage detection signal from the engine stoppage detection unit 26, and the output-normal signal from the output-normal determination unit 27. Determination of which atmospheric pressure sensor is abnormal depends on which one of the difference ΔPAMa and the difference ΔPAMb is larger. In particular, if the difference ΔPAMa is larger, it is determined that the atmospheric pressure sensor 9*a* is abnormal, and if the difference ΔPAMb is larger, it is determined that the atmospheric pressure sensor 9*b* is abnormal. The manifold pressure/second atmospheric pressure difference calculating unit 30, the manifold pressure/first atmospheric pressure difference calculating unit 31 and the second comparing unit 32 constitute an abnormality specifying device.

As described above, according to this embodiment, in a system including atmospheric pressure sensors provided in a plurality of systems, in order to specify the atmospheric pressure sensor whose function is lowered due to deterioration or the like, the failed atmospheric pressure sensor can be specified on the basis of the difference between the pressures detected by the respective atmospheric pressure sensor and the manifold pressure sensor.

In the embodiment described above, determination of abnormality and identification of the failed sensor are performed on the basis of the differences between the pressure values detected by the first atmospheric pressure sensor 9*a* and the second atmospheric pressure sensor 9*b*, and between the pressure values detected by the first atmospheric pressure sensor 9*a* and the second atmospheric pressure sensor 9*b* and the pressure detected by the manifold pressure sensor 5.

However, the invention is not limited thereto. Instead of the difference between the respective pressure values, determination of abnormality and identification of the failed sensor can be performed on the basis of the ratio value. For example, the atmospheric pressure difference calculating unit 28 may be replaced by device that calculates the ratio value between the pressures PAa and PAb. Then, the first comparing unit 29 is adapted to determine whether both of the first atmospheric pressure sensor 9*a* and the second atmospheric pressure sensor 9*b* are normal, or at least one of them is failed depending on whether the calculated ratio value is within the predetermined range from a predetermined value, that is, "1". For example, when the pressure PAa/PAb is within the range from 0.95 to 1.05, it is determined that both of the atmospheric pressure sensors 9*a* and 9*b* are operating normally, and when it is out of the range, it is determined that at least one of the first and second atmospheric pressure sensors 9*a* and 9*b* is operating abnormally.

In the same manner, the manifold pressure/second atmospheric pressure difference calculating unit 30 is replaced by device that calculates the ratio value between the pressures PAa and PMa, and then the manifold pressure/first atmospheric pressure difference calculating unit 31 is replaced by device that calculates the ratio value between the pressures PAb and PMa. The second comparing unit 32 is adapted to specify that the atmospheric pressure sensor corresponding to the pressure value which corresponds to the sensor whose calculated ratio value is deviated significantly from the predetermined value, that is, "1" is the failed sensor.

While a working example of the present invention has been described above, the present invention is not limited to the working example described above, but various design alterations may be carried out without departing from the present invention as set forth in the claims.

What is claimed is:

1. A diagnostic method for detecting failure of an atmospheric pressure sensor in an engine control system, the engine control system comprising:
   a first atmospheric pressure sensor,
   a second atmospheric pressure sensor used as a back up sensor for the first atmospheric pressure sensor, and
   a manifold pressure sensor,
   said diagnostic method comprising the steps of:
   determining failure of an atmospheric pressure sensor when the first atmospheric pressure sensor or the second atmospheric pressure sensor detects an atmospheric pressure value exceeding a predetermined value;
   comparing respective output values of the first and second atmospheric pressure sensors with an output value from the manifold pressure sensor; and
   specifying an atmospheric pressure sensor whose output value is larger in difference from the output value of the manifold pressure sensor as a failed atmospheric pressure sensor;
   wherein the step of specifying a failed atmospheric pressure sensor is performed when the engine is stopped.

2. The diagnostic method of claim 1, wherein when the first atmospheric pressure sensor is specified as a failed atmospheric pressure sensor, the engine control system uses the second atmospheric pressure sensor in controlling the engine.

3. The diagnostic method of claim 1, wherein the step of determining failure of an atmospheric pressure sensor further comprises the steps of:

determining a difference between an atmospheric pressure value detected by the first atmospheric pressure sensor and an atmospheric pressure value detected by the second atmospheric pressure sensor;

determining whether the absolute value of said difference exceeds a predetermined threshold; and when the absolute value of said difference exceeds the predetermined threshold, displaying an alarm indicating a failure of an atmospheric pressure sensor.

4. The diagnostic method of claim 1, wherein the step of determining failure of an atmospheric pressure sensor further comprises the steps of:

determining a difference between an atmospheric pressure value detected by the first atmospheric pressure sensor and an atmospheric pressure value detected by the second atmospheric pressure sensor;

determining whether the absolute value of said difference exceeds a predetermined threshold; and when the absolute value of said difference exceeds the predetermined threshold, determining which sensor of the first atmospheric pressure sensor and the second atmospheric pressure sensor is providing an abnormal output.

5. The diagnostic method of claim 4, wherein the step of determining which sensor of the first atmospheric pressure sensor and the second atmospheric pressure sensor is providing an abnormal output is accomplished by:

determining a first absolute difference value between an atmospheric pressure value detected by the first atmospheric pressure sensor and an atmospheric pressure value detected by the manifold pressure sensor, determining a second absolute difference value between an atmospheric pressure value detected by the second atmospheric pressure sensor and an atmospheric pressure value detected by the manifold pressure sensor, and comparing the first absolute difference value and the second absolute difference value, such that when the first absolute difference value is greater than the second absolute difference value, the first atmospheric pressure sensor is determined to be providing an abnormal output, and when the first absolute difference less than or equal to the second absolute difference, the second atmospheric pressure sensor is determined to be providing an abnormal output.

6. The diagnostic method of claim 5, wherein when the first atmospheric pressure sensor is determined to be providing an abnormal output, the engine control system employs the second atmospheric pressure sensor in the control of the engine, and when the second atmospheric pressure sensor is determined to be providing an abnormal output, the engine control system employs the first atmospheric pressure sensor in the control of the engine.

7. A failure diagnosis apparatus for diagnosing failure of atmospheric pressure sensors used in an engine control system, the engine control system comprising:

a first atmospheric pressure sensor, a second atmospheric pressure sensor used as a back up sensor for the first atmospheric pressure sensor, and a manifold pressure sensor, the failure diagnosis apparatus comprising:

an engine stoppage detection device that detects when an engine is stopped;

an abnormality recognizing device that outputs an alarm signal when a difference between a first detected atmospheric pressure value detected by the first atmospheric pressure sensor and a second detected atmospheric pressure value detected by the second atmospheric pressure sensor exceeds a threshold value; and an abnormality specifying device that, when the abnormality recognizing device outputs an alarm signal, specifies which of the first atmospheric pressure sensor and the second atmospheric pressure sensor is operating abnormally, wherein identification of the failed sensor by the abnormality specifying device is performed in response to the output of the alarm signal while the engine is stopped.

8. The failure diagnosis apparatus of claim 7, wherein the abnormality specifying device calculates the respective differences of the first detected atmospheric pressure value and the second detected atmospheric pressure value with respect to a value detected by the manifold pressure sensor, and specifies as a failed sensor the atmospheric pressure sensor which detects the atmospheric pressure value whose calculated difference is larger.

9. The failure diagnosis apparatus of claim 7, wherein determinations of differences by the abnormality recognizing device and the abnormality specifying device are performed using absolute values of the differences.

10. A failure diagnosis apparatus for atmospheric pressure sensors used in an engine control system, the engine control system comprising:

a first atmospheric pressure sensor for performing a main control of the engine, a second atmospheric pressure sensor that is used as a back up sensor for the first atmospheric pressure sensor, and a manifold pressure sensor, the failure diagnosis apparatus comprising:

an engine stoppage detection device that detects when an engine is stopped;

an abnormality recognizing device that outputs an alarm signal when a ratio between a first detected atmospheric pressure value, detected by the first atmospheric pressure sensor, and a second detected atmospheric pressure value detected by the second atmospheric pressure sensor is outside of a predetermined range; and an abnormality specifying device that specifies which of the first atmospheric pressure sensor and the second atmospheric pressure sensor is operating abnormally when the abnormality recognizing device outputs an alarm signal, wherein identification of the failed sensor by the abnormality specifying device is performed in response to the output of the alarm signal while the engine is stopped.

11. The failure diagnosis apparatus of claim 10, wherein the abnormality specifying device calculates a ratio between a value detected by the manifold pressure sensor and the first detected atmospheric pressure value, and a ratio between the value detected by the manifold pressure sensor and the second detected atmospheric pressure value, and specifies the atmospheric pressure sensor which detected the atmospheric pressure value corresponding to the one of the calculated ratio values which deviates more from the predetermined value as the failed sensor.

* * * * *